US012563528B2

(12) United States Patent
Zhang et al.

(10) Patent No.: US 12,563,528 B2
(45) Date of Patent: Feb. 24, 2026

(54) METHODS AND APPARATUSES FOR PAGING

(71) Applicant: LENOVO (BEIJING) LIMITED, Beijing (CN)

(72) Inventors: Yuantao Zhang, Beijing (CN); Yingying Li, Beijing (CN); Hongmei Liu, Beijing (CN); Zhi Yan, Beijing (CN); Haiming Wang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 315 days.

(21) Appl. No.: 18/261,068

(22) PCT Filed: Jan. 15, 2021

(86) PCT No.: PCT/CN2021/072200
§ 371 (c)(1),
(2) Date: Jul. 11, 2023

(87) PCT Pub. No.: WO2022/151365
PCT Pub. Date: Jul. 21, 2022

(65) Prior Publication Data
US 2024/0064700 A1 Feb. 22, 2024

(51) Int. Cl.
*H04W 68/02* (2009.01)

(52) U.S. Cl.
CPC .................................... *H04W 68/02* (2013.01)

(58) Field of Classification Search
CPC ........................... H04W 52/0216; H04W 68/02
See application file for complete search history.

(56) References Cited

U.S. PATENT DOCUMENTS

| | | | | |
|---|---|---|---|---|
| 2020/0267690 A1* | 8/2020 | Hsieh | .................... | H04W 76/28 |
| 2022/0190902 A1* | 6/2022 | Zhang | ................ | H04W 56/001 |

FOREIGN PATENT DOCUMENTS

| | | |
|---|---|---|
| CN | 105554863 A | 5/2016 |
| CN | 111837417 A | 10/2020 |
| WO | 2020168130 A1 | 8/2020 |

OTHER PUBLICATIONS

International Searching Authority, "Written Opinion of the International Searching Authority," PCT/CN2021/072200, Oct. 20, 2021, pp. 1-3.

(Continued)

*Primary Examiner* — Nader Bolourchi

(74) *Attorney, Agent, or Firm* — Kunzler Needham & Hilton

(57) ABSTRACT

Embodiments of the present application relate to methods and apparatuses for paging. An exemplary method may include: receiving paging configuration information, paging early indication (PEI) configuration information, and paging occasion (PO) association configuration information; determining a target PO associated with a UE based on the paging configuration information; determining a PEI based on the target PO and the PEI configuration information; determining a first time period for the PEI based on the PO association configuration information; and in the case that the target PO is within the first time period, determining that the target PO is associated with the PEI.

20 Claims, 7 Drawing Sheets

<u>100</u>

(56) References Cited

OTHER PUBLICATIONS

VIVO, "Paging enhancements for idle/inactive mode UE power saving", 3GPP TSG RAN WG1#103-e R1-2007673, Oct. 26-Nov. 13, 2020, pp. 1-14.

Mediatek Inc., "Paging Enhancements for UE Power Saving in NR", 3GPP TSG-RAN WG2 Meeting #111 electronic R2-2007190, Aug. 17-28, 2020, pp. 1-8.

Mediatek Inc., "Paging Enhancements for UE Power Saving in NR", 3GPP TSG-RAN WG2 Meeting #111 electronic R2-2008361, Aug. 17-28, 2020, pp. 1-8.

QUALCOMM Inc., "Power saving enhancements for paging reception", 3GPP TSG-RAN WG2 Meeting #112-e R2-2008892, Nov. 2-13, 2020, pp. 1-4.

Mediatek Inc., "Paging Enhancements for UE Power Saving in NR", 3GPP TSG-RAN WG2 Meeting #112-e R2-2009785, Nov. 2-13, 2020, pp. 1-5.

* cited by examiner

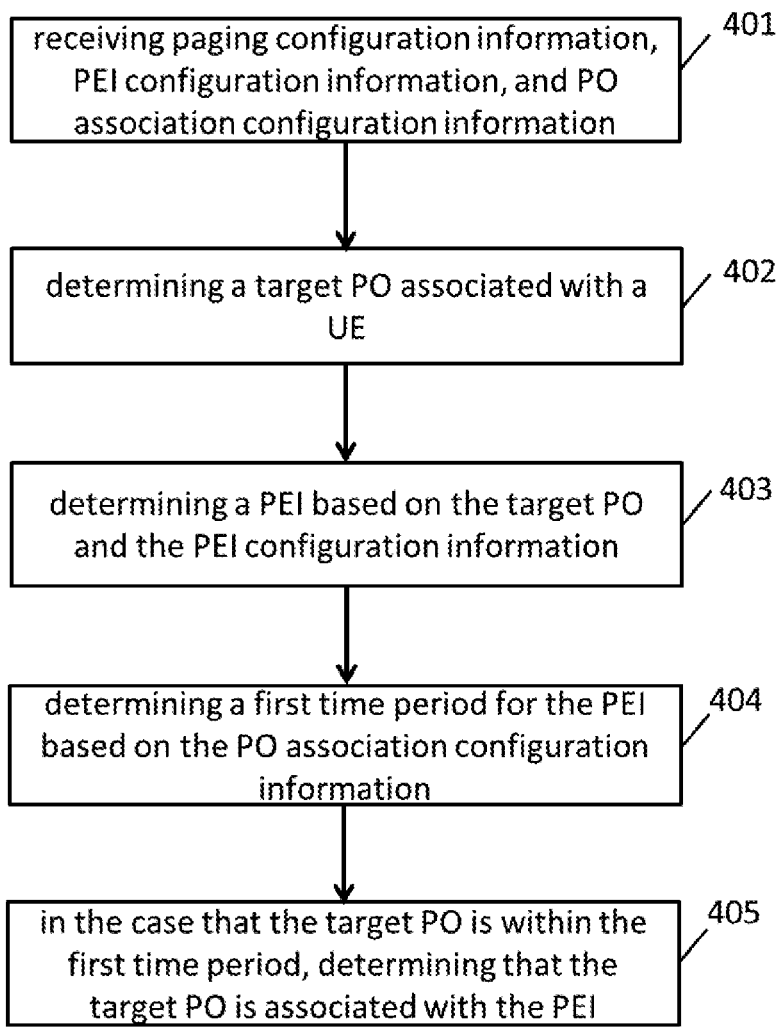

receiving paging configuration information, PEI configuration information, and PO association configuration information — 401 determining a target PO associated with a UE — 402 determining a PEI based on the target PO and the PEI configuration information — 403 determining a first time period for the PEI based on the PO association configuration information — 404 in the case that the target PO is within the first time period, determining that the target PO is associated with the PEI — 405

METHODS AND APPARATUSES FOR PAGING

TECHNICAL FIELD

Embodiments of the present application generally relate to wireless communication technologies, and especially to methods and apparatuses for paging.

BACKGROUND

For a user equipment (UE) in a radio resource control (RRC)_IDLE state or a RRC_INACTIVE state, paging allows the network to transmit data to the UE through paging messages, as well as to notify system information modification, earthquake and tsunami warning system (ETWS) indication, and/or commercial mobile alert system (CMAS) indication to the UE through short messages.

In addition, the UE in the RRC_IDLE state or RRC_I-NACTIVE state may use discontinuous reception (DRX) in order to reduce power consumption. In each DRX cycle (i.e., paging cycle), the UE may monitor one paging occasion (PO) in order to receive the paging message or short message. Such paging process may still have high power consumption because even if the UE is not paged in a PO, the UE still needs to perform unnecessary measurement and detection to try to receive the paging message or short message.

SUMMARY OF THE DISCLOSURE

Embodiments of the present application at least provide a technical solution for paging, which can at least reduce power consumption of a UE in a paging process.

According to some embodiments of the present application, a method may include: receiving paging configuration information, paging early indication (PEI) configuration information, and paging occasion (PO) association configuration information; determining a target PO associated with a UE based on the paging configuration information; determining a PEI based on the target PO and the PEI configuration information; determining a first time period for the PEI based on the PO association configuration information; and in the case that the target PO is within the first time period, determining that the target PO is associated with the PEI.

In some embodiments, the method may further include: in the case that the target PO is within the first time period, determining a first set of POs associated with the PEI in the first time period; and detecting a target bit in the PEI that is associated with target PO, wherein the target bit indicates whether a paging message or a short message is included in the target PO.

In an embodiment, determining the first set of POs associated with the PEI may include: determining a second set of POs in a second time period; and determining the first set of POs from the second set of POs based on the PO association configuration information.

In some embodiments, the PO association configuration information includes a PO offset, and determining that the target PO is associated with the PEI includes: in the case that an index of the target PO is equal to or larger than the PO offset, determining that the target PO is associated with the PEI.

In some embodiments, the PO configuration information includes a time offset, and determining that the target PO is associated with the PEI includes: in the case that a time gap between a starting time of the target PO and a starting time of a second time period is equal to or larger than the time offset, determining that the target PO is associated with the PEI.

In some embodiments, the PO configuration information includes an integer value, and determining that the target PO is associated with the PEI includes: in the case that a time gap between a starting time of the target PO and a starting time of a second time period is equal to or larger than the integer value multiplying with a third time period, determining that the target PO is associated with the PEI.

In some embodiments, the PEI configuration information includes a periodicity of the PEI. In an embodiment, the periodicity is determined based on a periodicity of a synchronization signal block (SSB).

In some embodiments, a starting time of the first time period is a default value or determined based on the PO association configuration information.

In some embodiments, a length of the first time period is a default value or determined based on the PO association configuration information.

In some embodiments, the first set of POs includes X number of POs and the PEI includes T number of bits, and wherein X and T are integers greater than 0.

In an embodiment, in the case that X is equal to the T, each PO in the first set of POs corresponds to an individual bit in the PEI.

In another embodiment, the method may further include: detecting a bit corresponding to the target PO, wherein the bit indicates whether the paging message or the short message is included in the target PO.

In another embodiment, in the case that X is larger than T, the first set of POs are divided into T groups of POs, and each group in the T groups corresponds to an individual bit in the PEI.

In another embodiment, the method may further include: detecting a bit corresponding to a group of POs including the target PO, wherein the bit indicates whether the paging message or the short message is included the group of POs.

In another embodiment, in the case that X is larger than T, each of last T number of POs in the first set of POs corresponds to an individual bit in the PEI.

In another embodiment, in the case that X is smaller than T, at least one UE associated with each PO in the first set of POs is divided into floor (T/X) groups of UEs, each group in the floor (T/X) groups corresponds to an individual bit in the PEI.

In another embodiment, the method may further include: detecting a bit corresponding to a group of UEs including the UE associated with the target PO, wherein the bit indicates whether the paging message or the short message for the group of UEs is included in the target PO.

According to some other embodiments of the present application, a method may include: transmitting paging configuration information, PEI configuration information, and PO association configuration information; determining a PEI based on the PEI configuration information; determining a first time period for the PEI based on the PO association configuration information; determining a first set of POs associated with the PEI in the first time period; and transmitting the PEI, wherein the PEI indicates whether a paging message or a short message is included in each of the first set of POs.

In some embodiments, determining the first set of POs associated with the PEI may include: determining a second set of POs in a second time period; and determining the first set of POs from the second set of POs based on the PO association configuration information.

In some embodiments, the PEI configuration information includes a periodicity of the PEI. In an embodiment, the periodicity is determined based on a periodicity of a SSB.

In some embodiments, a starting time of the first time period is a default value or determined based on the PO association configuration information.

In some embodiments, a length of the first time period is a default value or determined based on the PO association configuration information.

In some embodiments, the first set of POs includes X number of POs and the PEI includes T number of bits, and wherein X and T are integers greater than 0.

In an embodiment, in the case that X is equal to the T, each PO in the first set of POs corresponds to an individual bit in the PEI.

In another embodiment, in the case that X is larger than T, the first set of POs are divided into T groups of POs, and each group in the T groups corresponds to an individual bit in the PEI.

In another embodiment, in the case that X is larger than T, each of last T number of POs in the first set of POs corresponds to an individual bit in the PEI.

In another embodiment, in the case that X is smaller than T, at least one UE associated with each PO in the first set of POs is divided into floor (T/X) groups of UEs, each group in the floor (T/X) groups corresponds to an individual bit in the PEI groups of UEs, each group in the floor (T/X) groups corresponds to an individual bit in the PEI.

Some embodiments of the present application also provide an apparatus including: at least one non-transitory computer-readable medium having computer executable instructions stored therein, at least one receiving circuitry; at least one transmitting circuitry; and at least one processor coupled to the at least one non-transitory computer-readable medium, the at least one receiving circuitry and the at least one transmitting circuitry. The computer executable instructions are programmed to implement any method as stated above with the at least one receiving circuitry, the at least one transmitting circuitry and the at least one processor.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

FIG. 4 is a flow chart illustrating a method for paging according to some embodiments of the present application;

DETAILED DESCRIPTION

The detailed description of the appended drawings is intended as a description of the currently preferred embodiments of the present application and is not intended to represent the only form in which the present application may be practiced. It is to be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as 3rd generation partnership project (3GPP) 5G, 3GPP long term evolution (LTE) Release 8 and so on. Persons skilled in the art know very well that, with the development of network architecture and new service scenarios, the embodiments in the present application are also applicable to similar technical problems; and moreover, the terminologies recited in the present application may change, which should not affect the principle of the present application.

Figure 1:
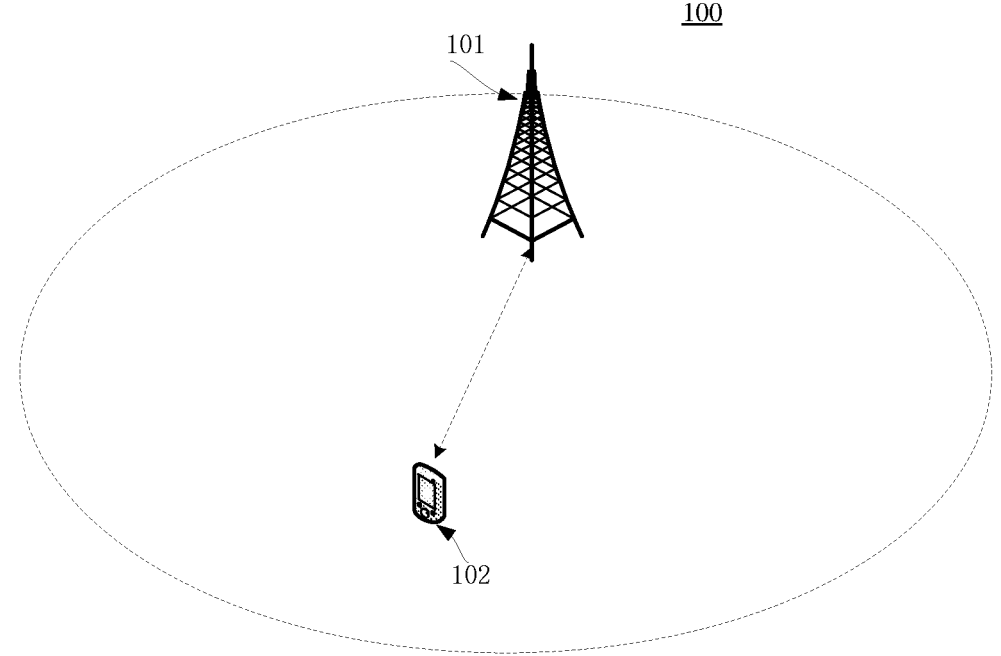
FIG. 1 is a schematic diagram illustrating an exemplary wireless communication system according to some embodiments of the present application.

FIG. 1 is a schematic diagram illustrating an exemplary wireless communication system 100 according to an embodiment of the present application.

As shown in FIG. 1, the wireless communication system 100 includes at least one BS 101 and at least one UE 102. In particular, the wireless communication system 100 includes one BS 101 and one UE 102 for illustrative purpose. Although a specific number of BS 101 and UE 102 are depicted in FIG. 1, it is contemplated that any number of BS s and UEs may be included in the wireless communication system 100.

The BS 101 may also be referred to as an access point, an access terminal, a base station, a macro cell, a node-B, an enhanced node B (eNB), a gNB, a home node-B, a relay node, or a device, or described using other terminology used in the art. The BS 101 is generally part of a radio access network that may include a controller communicably coupled to the BS 101.

In some embodiments, the UE 102 may include a computing device, such as a desktop computer, a laptop computer, a personal digital assistant (PDA), a tablet computer, a smart television (e.g., a television connected to the Internet), a set-top box, a game console, a security system (including security cameras), a vehicle on-board computer, a network device (e.g., a router, a switch, and a modem), or the like. In some embodiments, the UE 102 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments, the UE 102 may include a wearable device, such as a smart watch, a fitness band, an optical head-mounted display, or the like. Moreover, the UE 102 may be referred to as a subscriber unit, a mobile, a mobile station, a user, a terminal, a mobile terminal, a wireless terminal, a fixed terminal, a subscriber station, a user terminal, or a device, or described using other terminology used in the art.

The wireless communication system 100 is compatible with any type of network that is capable of sending and receiving wireless communication signals. For example, the wireless communication system 100 is compatible with a wireless communication network, a cellular telephone network, a time division multiple access (TDMA)-based network, a code division multiple access (CDMA)-based network, an orthogonal frequency division multiple access (OFDMA)-based network, an LTE network, a 3GPP-based network, a 3GPP 5G network, a satellite communications network, a high altitude platform network, and/or other communications networks.

For a UE in a RRC_IDLE state or a RRC_INACTIVE state, paging allows the network to transmit data to the UE through paging messages, as well as to notify system information modification, ETWS indication, and/or CMAS indication to the UE through short messages. The paging message or the short message may be scheduled by downlink control information (DCI) identified with paging radio network temporary identity (P-RNTI) on physical downlink control channel (PDCCH).

In addition, the UE in the RRC_IDLE state or RRC_INACTIVE state may use discontinuous reception (DRX) in order to reduce power consumption. Each DRX cycle (i.e., paging cycle) may include at least one paging frame (PF). Each PF may be a radio frame and contain one or more POs. Each PO may be a set of PDCCH monitoring occasions in which DCI scheduling the paging message or short message may be transmitted. Each PO may include one or more time slots. In each paging cycle, the UE needs to monitor one PO. The PO monitored by the UE may be referred as a target PO for the UE. The target PO may be determined from at least one PO in the paging cycle based on UE identity (ID) as specified in 3GPP standard documents. The UE may wake up from a sleep mode to receive the paging message or short message in the target PO, and then go to sleep if the UE is not paged in the target PO.

For the UE in the RRC_IDLE state or in the RC_INACTIVE state, the configurations for paging (e.g., paging configuration information) may be broadcasted through PCCH-Config information element (IE) in system information block 1 (SIB1) as specified in 3GPP standard documents. The configurations for paging may include paging cycle, the number of PF per paging cycle, the number of POs per PF, etc. Table 1 shows some relevant configuration fields and the descriptions included in the PCCH-Config IE.

6

TABLE 1

| Relevant fields in paging configuration | |
|---|---|
| Configuration fields | Descriptions |
| defaultPagingCycle | Default paging cycle. Candidate values {rf32, rf64, rf 128, rf256} |
| nAndPagingFrameOffset | Used to derive the number of paging frame in a paging cycle and paging frame offset. Candidate values paging frame derivation {1T, halfT, quarterT, oneEighthT, oneSixteenthT}. T is the paging cycle. |
| ns | Number of paging occasions per paging frame. Candidate values {4, 2, 1} |
| firstPdcch-MonitoringOccasionOfPO | The first PDCCH monitoring occasion for paging of each PO of the PF. |

Referring to Table 1, the value of the parameter defaultPagingCycle may be rf32, rf64, rf128, or rf256, which respectively indicates that the paging cycle includes 32 radio frames, 64 radio frames, 128 radio frames, or 256 radio frames. The value of the parameter nAndPagingFrameOffset may be 1T, half, quarterT, oneEighthT, or oneSixteenthT, which is used to derive the number of paging frame and paging frame offset in each paging cycle. For example, assuming that the paging cycle is 32 radio frames, and the value of nAndPagingFrameOffset is oneSixteenthT, then the paging cycle may include 16 PFs and the paging frame offset between two PFs is 2 radio frames. The value of the parameter ns may be 4, 2, or 1, which indicates that each PF includes 4 POs, 2 POs, or 1 PO. The parameter firstPdcch-MonitoringOccasionOfPO may indicate the first PDCCH monitoring occasion for paging of each PO of the PF.

In actual implementation, a UE may decide a target PO in each paging cycle and wake up before the target PO. The UE may then measure one or more SSBs for automatic gain control (AGC) and time and/or frequency tracking before the target PO to obtain residual frequency error less than 0.2 ppm for robust paging reception. The SSB may be transmitted periodically according a periodicity of the SSB. Depending on the channel status of UEs, different number of SSBs needs to be measured for different UEs. For example, for the UEs with good channel status, only one SSB needs to be measured before the target PO, while for UEs with deteriorated channels status, up to three SSBs need to be measured before the target PO for the measurement. Therefore, before the target PO, the UE may need to measure the downlink channel status, decide the number of SSBs for measurement, and correspondingly wake up for measure the number of SSBs. After that, the UE may detect PO to check if there is a paging message or short message for the UE.

Figure 2A:
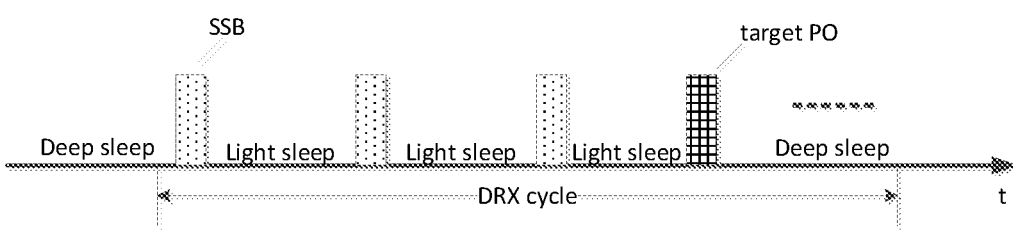
FIG. 2(a) illustrates an example of synchronization signal block (SSB) measurement for a UE with low signal to interference plus noise ratio SINR according to some embodiments of the present application.

FIG. 2(a) illustrates an example of SSB measurement for a UE with low SINR according to some embodiments of the present application.

Referring to FIG. 2(a), in a DRX cycle, the UE may monitor a target PO to check if there is a paging message or short message for the UE. In the example of FIG. 2(a), before detecting the target PO, three SSBs may need to be measured for AGC and time and/or frequency tracking. The SSB may be transmitted periodically according a periodicity of the SSB (e.g., 20 ms).

Before the SSB measurement, the UE is in a deep sleep mode, which needs the lowest power consumption. Then the UE may go to a light sleep mode for performing measurements on three SSBs until target PO detection. If there is no paging message or short message for the UE in the target PO, the UE may go back to the deep sleep mode after detecting the PO.

Figure 2B:
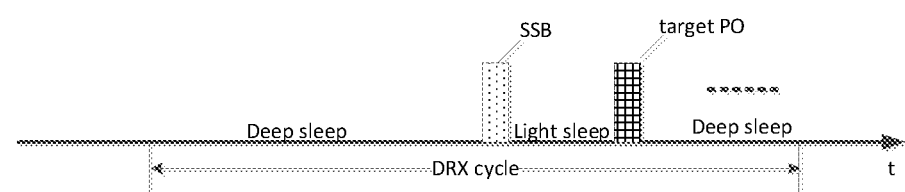
FIG. 2(b) illustrates another example of SSB measurement for a UE with high SINR according to some other embodiments of the present application.

FIG. 2(b) illustrates another example of SSB measurement for a UE with high SINR according to some other embodiments of the present application.

Referring to FIG. 2(b), in a DRX cycle, the UE may monitor a target PO to check if there is a paging message or short message for the UE. In the example of FIG. 2(b), before detecting the target PO, only one SSB may need to be measured for AGC and time and/or frequency tracking. The SSB may be transmitted periodically according a periodicity of the SSB (e.g., 20 ms).

Before the SSB measurement, the UE is in a deep sleep mode, which needs the lowest power consumption. Then the UE may go to a light sleep mode for performing measurement on the one SSB until target PO detection. If there is no paging message or short message for the UE in the target PO, the UE may go back to the deep sleep mode after detecting the PO.

Although the DRX may be used by a UE to reduce power consumption, the power consumption in the above paging process may be still high, by considering the paging rate is low (e.g., 10%) for the typical UE traffic in the actual network. This is because even if a UE is not paged in the target PO, the UE may still need to perform unnecessary SSB measurement, stay in a light sleep mode for a long period, and perform unnecessary paging message reception. In order to further reduce the power consumption in the paging process, a PEI before the PO may be used to indicate whether a paging message or a short message is included in the target PO. In the case that the PEI indicates that a paging message or a short message is not included in the target PO, the UE does not need to perform the paging detection in the target PO. In the case that the PEI indicates that a paging message or a short message is included in the target PO, the UE may need to perform the paging detection in the target PO.

Figure 3A:
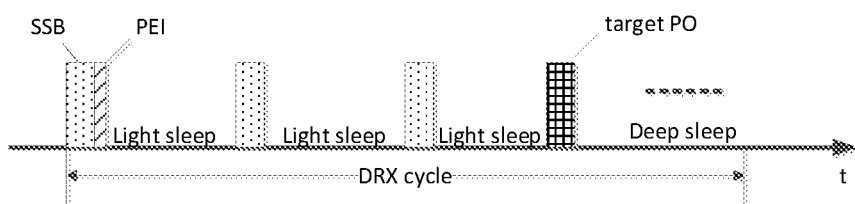
FIG. 3(a) illustrates an example of PEI transmission for a UE with low SINR according to some embodiments of the present application.

FIG. 3(a) illustrates an example of PEI transmission for a UE with low SINR according to some embodiments of the present application.

Referring to FIG. 3(a), for the UE with low SINR, before detecting the target PO, three SSBs may need to be measured for AGC and time and/or frequency tracking. A PEI may be transmitted after the first SSB. The PEI in FIG. 3(a) may indicate that there is a paging message or a short message is included in the target PO. Then, after detecting the PEI, the UE may perform the same operations as illustrated in FIG. 2(a) and detect the target PO.

Figure 3B:
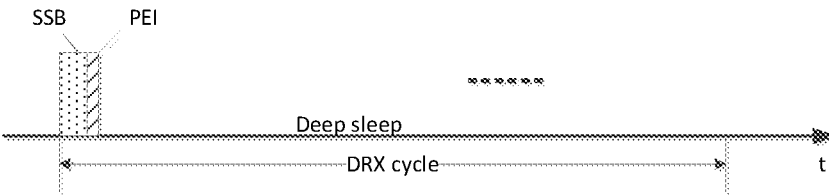
FIG. 3(b) illustrates another example of PEI transmission for a UE with low SINR according to some other embodiments of the present application.

FIG. 3(b) illustrates an example of PEI transmission for a UE with low SINR according to some other embodiments of the present application. Similar to FIG. 3(a), a PEI may be transmitted after the first SSB. However, the PEI in FIG. 3(b) indicates that the target PO does not include a paging message or a short message. Then, after detecting the PEI, the UE does not need to perform the following SSB measurement and target PO detection. Instead, the UE can just go back to a deep sleep mode.

The PEI may be used for reducing power consumption for both the UEs with high SINR and low SINR. Especially, the PEI might be more meaningful for UEs with low SINR UEs which need to measure more SSBs. For UEs with high SINR, since only one SSB needs to be measured before the target PO, the power saving gained from the PEI is less than that for UEs with low SINR.

By using the PEI, the performance of control information for paging is dominated by the joint block error rate (BLER) of the PEI and the PDCCH carrying DCI for scheduling the PO. Since the performance of control information for paging is better than that of the paging data channel, a limited number of bits in the PEI is required to guarantee the robust performance. For example, only several bits (e.g., <10 bits) might be included in the PEI for paging indication.

Given the above, embodiments of the present application may provide technical solutions for paging, which can use limited bits in the PEI to indicate whether paging messages or short messages are included in multiple POs (i.e., use limited bits for paging indication for multiple POs), so as to achieve power saving. More details on embodiments of the present application will be illustrated in the following text in combination with the appended drawings.

FIG. 4 is a flow chart illustrating an exemplary procedure of a method for paging according to some embodiments of the present application. The method may be performed by a UE, for example, the UE 102 as shown in FIG. 1.

In the exemplary method shown in FIG. 4, in step 401, the UE may receive paging configuration information, PEI configuration information, and PO association configuration information.

The paging configuration information may be broadcasted through PCCH-Config IE in SIB1 as specified in 3GPP standard documents. The paging configuration information may include paging cycle, the number of PF per paging cycle, the number of POs per PF, etc. For example, the paging configuration information may include the parameters as shown in Table 1.

The PEI information may be a default value, broadcasted by the network, or configured by the network in a RRC message. The PEI configuration information may include a periodicity of the PEI. In an embodiment of the present application, the periodicity of the PEI is determined based on a periodicity of a SSB. For example, the periodicity of the PEI may be determined as N* periodicity of the SSB.

The PO association configuration information may be used to determine a first time period associated with a PEI for the UE. The PO association configuration information may be a default value, broadcasted by the network (e.g., the BS), or configured by the network in a RRC message.

In some embodiments, the PO association configuration information may directly indicate the first time period. In an embodiment, the PO association configuration information may indicate a starting time of the first time period and a length of the first time period. In another embodiment, the PO association configuration information may indicate a starting time of the first time period and an end time of the first time period.

The starting time or the end time of the first time period may be a default value (for example, the starting time of the first time period may be the first PDCCH monitoring occasion of the first PO after the time with the PEI), broadcasted by the network, or configured by the network in a RRC message.

In an embodiment, the starting time or the end time of the first time period may be a radio frame, a subframe, a timeslot, an orthogonal frequency division multiplexing (OFDM) symbol, a PDCCH monitoring occasion, or any other time. In an embodiment, the starting time or the end time may be relative to the time with the PEI. That is, the starting time or the end time may be a time offset from the time with the PEI. For example, assuming that the starting time and the end time of the first time period is 2 radio frames and 10 radio frames and the time with the PEI is a radio frame #10, the first time period may be from radio frame #13 to radio frame #20.

The length of the first time period may be a default value (e.g., 60 ms, which corresponds to 3 SSBs with 20 ms default periodicity), broadcasted by the network, or configured by the network in a RRC message. In an embodiment, the length of the first time period may be a number of radio frames, subframes, timeslots, OFDM symbols, or any other time length.

In some other embodiments, the PO association configuration information may indicate a second time period and an offset. The second time period and the offset may be used to determine the first time period associated with a PEI for the UE. The configurations for the second time period may be similar to those for the first time period. That is, the PO association configuration information may indicate a starting time of the second time period and a length (or an end time) of the second time period. In another embodiment, the starting time of the second time period and the length (or the end time) of the second time period may be predefined (e.g., may be default values).

In an embodiment, the offset may be a PO offset indicating a PO number. In another embodiment, the offset may be a time offset. In another embodiment, the offset may be an integer value.

After receiving the paging configuration information, in step 402, the UE may determine a target PO in each paging cycle based on an ID of the UE as specified in 3GPP standard documents.

Then, in step 403, the UE may determine a PEI based on the target PO and the PEI configuration information. The PEI may be transmitted periodically based on the periodicity of the PEI. However, whether there is PEI in a time point depends on whether there are POs in the first time period associated with the PEI.

For example, after determining the target PO in a paging cycle, the UE may determine a starting SSB which is transmitted before the measurement performed by the target PO. Then, the UE may determine a PEI associated with the starting SSB and transmitted after the starting SSB based on the PEI configuration information (e.g., periodicity of the PEI).

After determining the PEI, in step 404, the UE may determine a first time period associated with PEI based on the PO association configuration information.

In the case that the PO association configuration information directly indicates the first time period, the UE may determine the first time period based on the starting time and the length (or an end time) of the first time period. For example, the first time period may be determined as 6 radio frames (e.g., 60 ms) after the radio frame with the PEI.

In the case that the PO association configuration information indicates the second time period and the offset, the UE may determine the first time period to be the second time period minus a time period associated with the offset.

In an embodiment, assuming that the offset is a PO offset which indicates X POs. The first time period may be determined as a period which is from a starting time of the $(X+1)^{th}$ PO to the end of the second time period.

In another embodiment, assuming that the offset is a time offset, the first time period may be determined as the second time period minus the time offset. For example, assuming that the second time period is 60 ms after the radio frame transmitting the PEI and the time offset is 20 ms, the first time period may be determined as the last 40 ms of the second time period.

In another embodiment, assuming that the offset is an integer value, the first time period may be determined as the second time period minus a time offset. The time offset may be the integer value multiplying with a third time period. The third time period may be a default value, broadcasted by the network, or configured by the network. For example, assuming that the second time period is 60 ms after the radio frame transmitting the PEI, the integer is 5, and the third time period is 4 ms, then the first time period may be determined as the last 40 ms (i.e., 60–5*4) of the second time period.

In another embodiment, assuming the offset is a PDCCH monitoring occasion offset which indicates X PDCCH monitoring occasions, wherein X is an integer larger than 0. The first time period may be determined as a period which is from a starting time of the $(X+1)^{th}$ PDCCH monitoring occasion to the end of the second time period.

After determining the first time period, the UE may determine whether the target PO is within the first time period. In step 405, in the case that the target PO is within the first time period, the UE may determine that the target PO is associated with the PEI. That is, the UE may determine that the PEI may be used to indicate whether a paging message or a short message (i.e., paging existence) is included in the target PO.

In an embodiment, the UE may compare the starting time of the target PO with the starting time of the first time period. In the case that starting time of the target PO is larger than or equal to the starting time of the first time period, the UE may determine that the target PO is within the first time period.

In another embodiment, the first time period may be determined based on the second time period and the PO offset. In this case, the UE may compare an index of the target PO in the second time period with the PO offset. In the case that the index of the target PO is equal to or larger than the PO offset, the UE may determine that the target PO is within the first time period (i.e., the target PO is associated with the PEI). For example, assuming that the PO offset is 3 POs and the index of the target PO in the second time period is #4, the UE may determine that the target PO is within the first time period.

In another embodiment, the first time period may be determined based on the second time period and the time offset. In this case, the UE may compare a time gap between a starting time of the target PO and a starting time of a second time period with the time offset. In the case that the time gap between the starting time of the target PO and the starting time of the second time period is equal to or larger than the time offset, the UE may determine that the target PO is within the first time period (i.e., the target PO is associated with the PEI). For example, assuming that the time offset is 20 ms and the gap is 30 ms, the UE may determine that the target PO is within the first time period.

In another embodiment, the first time period may be determined based on the second time period and the integer value. In this case, the UE may compare a time gap between a starting time of the target PO and a starting time of a second time period with the integer value multiplying with a third time period. In the case that the time gap between the starting time of the target PO and the starting time of the second time period is equal to or larger than the integer value multiplying with a third time period, the UE may determine that the target PO is within the first time period (i.e., the target PO is associated with the PEI). For example, assuming that the integer value is 5, the third time period is 4 ms, and the gap is 30 ms, then the UE may determine that the target PO is within the first time period.

In an embodiment, the UE may determine a PO (e.g., a target PO) is within a time period, either a first time period or a second time period, if the first PDCCH monitoring occasion of the PO is within the time period. In another embodiment, the UE may determine a PO is within a time period, either a first time period or a second time period, if all the PDCCH monitoring occasions of the PO are within the time period.

According to some embodiments, in the case that the target PO is within the first time period, the UE may determine a first set of POs associated with the PEI in the first time period. That is, the PEI may be used to indicate whether a paging message or a short message is included in each of the first set of POs. Then, the UE may detect a target bit in the PEI that is associated with target PO. The target bit may indicate whether a paging message or a short message is included in the target PO.

In some embodiment, the UE may determine a first set of POs associated with the PEI in the first time period based on the paging configuration information. For example, at least based on the parameters in Table 1, the UE may determine a first set of POs in the first time period.

In some other embodiments, the first time period may be determined based on the second time period and the offset. In this case, the UE may first determine a second set of POs in the second time period based on the paging configuration information, and then determine the first set of POs from the second set of POs based on the PO association configuration information (e.g., the offset).

In an embodiment, the offset may be a PO offset. In this embodiment, the second set of POs may include Y POs (Y is an integer larger than 0). The Y POs are indexed with #0 to #Y−1 from the first PO after the PEI to the last PO in an increasing order. The PO offset may be X POs, wherein X is an integer larger than 0 and is less than or equal to Y. Then the first set of POs may include a PO with index #X to the PO with index #Y−1 in the second time period. In an embodiment, all POs of the first set of POs are indexed with #0 to #Y−X−1.

Figure 5:
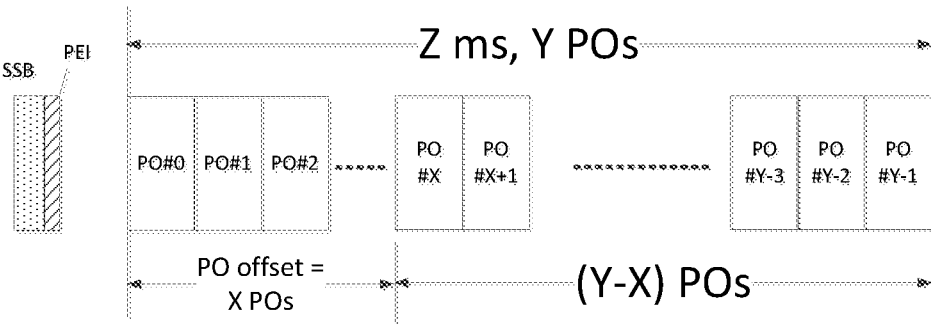
FIG. 5 illustrates an example of determining a first set of POs associated with a PEI according to some embodiments of the present application.

For example, FIG. 5 illustrates an example of determining a first set of POs associated with a PEI according to some embodiments of the present application.

Referring to FIG. 5, the PO association configuration information may indicate a second time period and a PO offset. The PO association configuration information may indicate that the starting of the second time period is the first PDCCH monitoring occasion of the first PO after the time with PEI and the length of the second time period is Z ms. The PO association configuration information may indicate that the PO offset is X POs. Although the POs shown in FIG. 5 are continuous in time domain, the POs may be not continuous in time domain in actual transmission.

As shown in FIG. 5, Y POs are determined to be included in Z ms. The Y POs are indexed with #0 to #Y−1 from the first PO after the PEI to the last PO in an increasing order. Given this, the first set of POs may include (Y−X) POs which are from a PO with index #X to the PO with index #Y−1.

In another embodiment, the offset may be a time offset. Then, the first set of POs may include a first PO after the time offset to the last PO in the second time period.

In an embodiment, the offset may be an integer value. Then, the first set of POs may include a first PO after a time offset to the last PO in the second time period. The time offset may be determined to be the integer value multiplying with a third time period.

In another embodiment, the offset may be a PDCCH monitoring occasion offset. Then the first time period may start from a first PDCCH monitoring occasion after the PDCCH monitoring occasion offset to the end of the second time period.

The PEI may include at least one bit which is used for paging indication for the first set of POs associated with the PEI in the first time period. Depending on the number of POs in the first set of POs and the number of bits in the PEI, paging existence for the first set of POs may be indicated by the bits in the PEI with different methods.

According to some embodiments, the first set of POs includes X number of POs and the PEI includes T number of bits, and wherein X and T are integers greater than 0.

In some embodiments, X is equal to the T, and thus each PO in the first set of POs may correspond to an individual bit in the PEI. Then, the UE may detect a bit corresponding to the target PO, wherein the bit indicates whether the paging message or the short message is included in the target PO. In this case, all of the first set of POs may be indexed in an increasing order in time domain. The bit corresponding to the target PO may be determined based on the index of the target PO in the first set of POs.

For example, assuming that X=T=10, the bits included in PEI are "1110010001", and the 10 POs in the first set of POs may be indexed with #0, #1, . . . , #9 in an increasing order in time domain. Each PO may correspond to a bit in the PEI. For example, the first PO may correspond to the first bit in the PEI, the second PO may correspond to the second bit in the PEI, . . . , and the tenth PO may correspond to the tenth bit in the PEI. Assuming that the target PO has an index #4, the UE may determine that the fifth bit in the PEI is used to indicate whether the paging message or the short message is included in the target PO. In this example, the fifth bit in the PEI is "0," which may indicate that the target PO does not include the paging message or the short message. After detecting the bit, the UE may not perform the following SSB measurement and PO detection.

In some other embodiments, X is larger than T. In an embodiment, in order to use T bits to indicate the paging message or short message for the X POs, the first set of POs may be divided into T groups of POs, and each group in the T groups may correspond to an individual bit in the PEI. The maximum number of POs included in each group may be ceil (X/T). Then, the UE may detect a bit corresponding to a group of POs including the target PO, in which the bit indicates whether the paging message or the short message is included the group of POs. In this case, all of the first set of POs may be indexed in an increasing order in time domain, based on which the UE determines the group of POs to which the target PO belongs.

For example, assuming that X=7, T=5, the bits included in PEI are "11100", and the 7 POs in the first set of POs may be indexed with #0, #1, . . . , #6 in an increasing order in time domain. The 7 POs may be divided in to 5 groups, the first group may include POs #0 and #1, the second group may include POs #2 and #3, the third group may include PO #4, the fourth group may include PO #5, and the fifth group may include PO #6. The first group may correspond to the first bit in the PEI, the second group may correspond to the second bit in the PEI, . . . , and the fifth group may correspond to the fifth bit in the PEI.

Assuming that the target PO has an index #1 (which means that the target PO is in the first group), the UE may determine that the first bit in the PEI is used to indicate whether the paging message or the short message is included in the first group of POs. In this example, the third bit in the PEI is "1," which may indicate that the target PO includes the paging message or the short message. After detecting the bit, the UE may perform the following SSB measurement and target PO detection.

In another embodiment, in the case that X is larger than T, the first set of POs may be divided into ceil (X/T) groups of POs, and each group in the ceil (X/T) groups may correspond to an individual bit in the PEI. Then, the UE may detect a bit corresponding to a group of POs including the target PO, wherein the bit indicates whether the paging message or the short message is included the group of POs.

In yet another embodiment, in the case that X is larger than T, the first set of POs may be divided into a number of groups, wherein each group may include ceil (X/T) of POs. Each group in the number groups may correspond to an individual bit in the PEI. Then, the UE may detect a bit corresponding to a group of POs including the target PO, wherein the bit indicates whether the paging message or the short message is included the group of POs.

Figure 6:
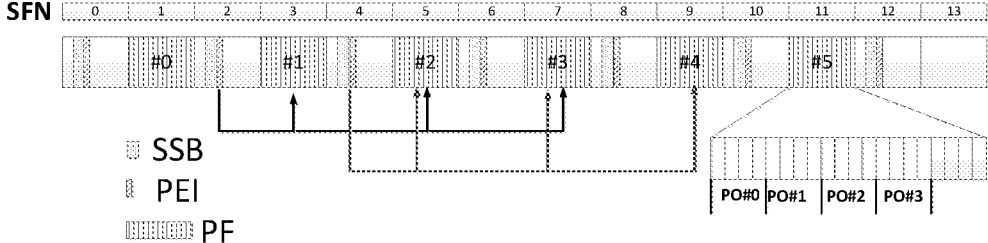
FIG. 6 illustrates an example of using PEI for paging indication according to some embodiments of the present application.

FIG. 6 illustrates an example of using PEI for paging indication according to some embodiments of the present application. In the example of FIG. 6, the number of POs in the first set of POs is larger than the number of bits for paging indication in PEI (e.g., X is larger than T).

FIG. 6 shows 14 radio frames (system frames) in a paging cycle. The 14 radio frames may have system frame number from SFN #0 to SFN #13. The PF is configured to be in every other system frame. There are four POs (e.g., PO #0, PO #1, PO #2, and PO #3) configured in each PF. The first time period associated with a PEI may be 6 radio frames (i.e., 60 ms) after the radio frame with the PEI. That is, each PEI is associated with POs in three PFs. For example, the PEI that is transmitted in the frame with SFN #2 indicates the paging existence for the POs in PF #1, #2, #3, i.e., totally 12 POs.

As shown in FIG. 6, in the case that there are 8 bits for paging indication in the PEI, which does not have the capability to indicate the paging existence for 12 POs), the 12 POs may be divided into 6 groups, each group may have ceil (12/8)=2 POs. For example, the first group may include PO #0 and PO #1 in PF #1, the second group may include PO #2 and PO #3 in PF #1, the third group may include PO #0 and PO #1 in PF #2, the fourth group may include PO #2 and PO #3 in PF #2, the fifth group may include PO #0 and PO #1 in PF #3, and the sixth group may include PO #2 and PO #3 in PF #3. Each group may correspond to a bit in the PEI. For example, the first group to the sixth group may correspond to the first bit to the sixth bit in the PEI, respectively. For each group, the bit corresponding to the corresponding group may indicate whether a paging message or short message is included in the corresponding group.

In yet another embodiment, in the case that X is larger than T, each of last T number of POs in the first set of POs may correspond to an individual bit in the PEI.

For example, assuming that X=7, T=5, the bits included in PEI are "11100", and the 7 POs in the first set of POs may be indexed with #0, #1, #6 in an increasing order in time domain. Then, each of the last 5 POs in the 7 POs (i.e., PO #2, PO #3, PO #4, PO #5, and PO #6) may correspond to a bit in the PEI. For example, PO #2 may correspond to the first bit in PEI, PO #3 may correspond to the second bit in PEI, PO #4 may correspond to the third bit in PEI, PO #5 may correspond to the fourth bit in PEI, PO #6 may correspond to the fifth bit in PEI.

Assuming that the target PO has an index #5, then the UE may determine that the fourth bit in the PEI is used to indicate whether the paging message or the short message is included in the target PO. In this example, the fourth bit in the PEI is "0," which may indicate that the target PO does not include the paging message or the short message in the POs with index #0 and #1. After detecting the bit, the UE may not perform the following SSB measurement and target PO detection.

In yet another embodiment, in the case that X is larger than T, each of last T−1 number of POs in the first set of POs may correspond to an individual bit in the PEI, and the rest POs are grouped to a PO group and are correspondingly to an individual bit in the PEI.

For example, assuming that X=7, T=5, the bits included in PEI are "11100", and the 7 POs in the first set of POs may be indexed with #0, #1, . . . , #6 in an increasing order in time domain. Then, each of the last 4 POs in the 7 POs (i.e., PO #3, PO #4, PO #5, and PO #6) may correspond to an individual bit in the PEI. The rest POs (i.e., PO #0, PO #1, and PO #2) may be grouped to form a PO group and may correspond to an individual bit in the PEI.

For example, the PO group (i.e., including PO #0, PO #1, and PO #2) may correspond to the first bit in PEI, which indicates whether paging message(s) or short message(s) are included in the PO group, PO #3 may correspond to the second bit in PEI which indicates whether a paging message and a short message is included in PO #3, PO #4 may correspond to the third bit in PEI which indicates whether a paging message and a short message is included in PO #4, PO #5 may correspond to the fourth bit in PEI which indicates whether a paging message and a short message is included in PO #5, PO #6 may correspond to the fifth bit in PEI which indicates whether a paging message and a short message is included in PO #6.

In some other embodiments, X is smaller than T. Then, the at least one UE associated with each PO in the first set of POs is divided into floor (T/X) groups of UEs. Each group in the floor (T/X) groups may correspond to an individual bit in the PEI. After that, the UE may detect a bit corresponding to a group of UEs including the UE associated with the target PO, wherein the bit indicates whether the paging message or the short message for the group of UEs is included in the target PO.

Figure 7:
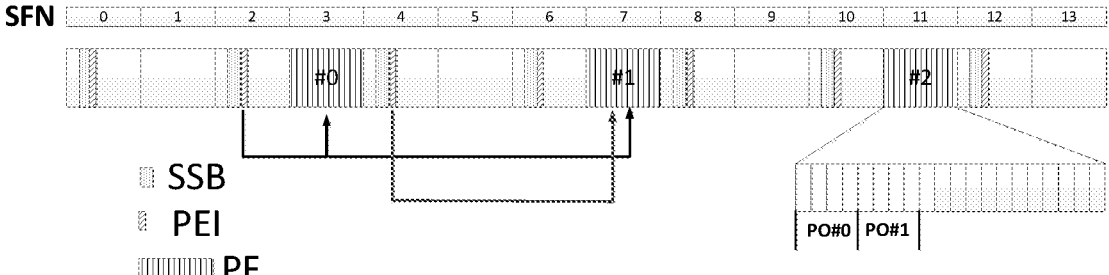
FIG. 7 illustrates an example of using PEI for paging indication according to some other embodiments of the present application.

FIG. 7 illustrates an example of using a PEI for paging indication according to some other embodiments of the present application. In the example of FIG. 7, the number of POs in the first set of POs is less than the number of bits for paging indication in PEI (e.g., X is smaller than T).

FIG. 7 shows 14 radio frames (system frames) in a paging cycle. The 14 radio frames may have system frame number from SFN #0 to SFN #13. The PF is configured to be in every four system frames. There are 2 POs (e.g., PO #0 and PO #1) configured in each PF. The first time period associated with a PEI may be 6 radio frames (i.e., 60 ms) after the radio frame with the PEI. Given this, for the PEI that is transmitted in the frame with SFN #2, it indicates the paging existence for the POs in PF #0 and #1, i.e., totally 4 POs. The PEI in SFN #4 indicates the paging existence for the POs in PF #1.

Assuming that there are 8 bits for paging indication in the PEI, then for the PEI in SFN #2, the UEs in each of the associated PO (i.e., PO #0 and PO #1 in PF #0 and PO #0 and PO #1 in PF #1) could be divided to be 2 groups. That is, there are total 8 groups for the four POs.

For example, the 8 groups may include group #0 associate with PO #0 in PF #1, group #1 associate with PO #0 in PF #1, group #2 associate with PO #1 in PF #1, group #3 associate with PO #1 in PF #1, group #4 associate with PO

0 in PF #2, group #5 associate with PO #0 in PF #2, group #6 associate with PO #1 in PF #2, group #7 associate with PO #1 in PF #2. Each group may correspond to a bit in the PEI. Group #0 to group #7 may correspond to the first bit to the eight bit in the PEI, respectively. Assuming that the target PO may be PO #1 in PF #0 and the UE may be in group #1, the UE may determine that the second bit in the PEI is used to indicate the paging existence for the target PO, and thus the UE may detect the second bit in the PEI.

For PEI in SFN #4, there are total 4 groups for the four POs, and each group may correspond to a bit in the PEI, which is similar to that as the PEI in SFN #2.

Figure 8:
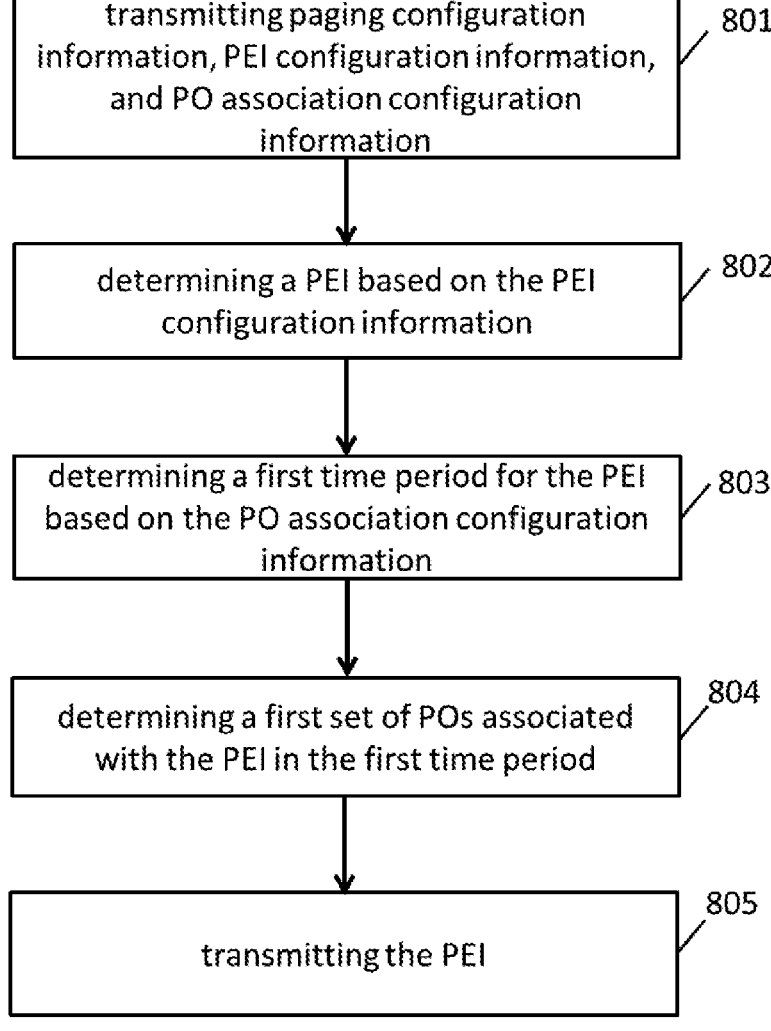
FIG. 8 is a flow chart illustrating a method for paging according to some other embodiments of the present application.

FIG. 8 is a flow chart illustrating an exemplary procedure of a method for paging according to some embodiments of the present application. The method may be performed by a BS, for example, the BS 101 as shown in FIG. 1.

In the exemplary method shown in FIG. 8, in step 801, the BS may transmit paging configuration information, PEI configuration information, and PO association configuration information to at least one UE.

The paging configuration information may be broadcasted through PCCH-Config IE in SIB1 as specified in 3GPP standard documents. The paging configuration information may include paging cycle, the number of PF per paging cycle, the number of POs per PF, etc. For example, the paging configuration information may include the parameters shown in table 1.

The PEI information may be broadcasted by the network or configured by the network in a RRC message. The PEI configuration information may include a periodicity of the PEI. In an embodiment of the present application, the periodicity of the PEI is determined based on a periodicity of a SSB. For example, the periodicity of the PEI may be determined as N* periodicity of the SSB.

The PO association configuration information may be used to determine a first time period associated with a PEI for the UE. The PO association configuration information may be broadcasted by the network or configured by the network in a RRC message. The contents included in the PO association configuration information may be the same as those in the embodiments in FIG. 4.

For example, the PO association configuration information may directly indicate the first time period. In an embodiment, the PO association configuration information may indicate a starting time of the first time period and a length of the first time period. In another embodiment, the PO association configuration information may indicate a starting time of the first time period and an end time of the first time period.

The starting time or the end time of the first time period may be a default value (for example, the starting time of the first time period may be the first PDCCH monitoring occasion of the first PO after the time with PEI), broadcasted by the network, or configured by the network in a RRC message.

The length of the first time period may be a default value (e.g., 60 ms, which corresponds to 3 SSBs with 20 ms default periodicity), broadcasted by the network, or configured by the network in a RRC message. In an embodiment, the length of the first time period may be a number of radio frames, subframes, timeslots, OFDM symbols, or any other time length.

In another example, the PO association configuration information may indicate a second time period and an offset. The second time period and the offset may be used to determine the first time period associated with a PEI.

Step 801 is an optional step. In some other embodiment, the PEI configuration information and/or PO association configuration information may be predefined (e.g., default values), and the BS may not transmit the information to at least one UE.

Then, in step 802, the BS may determine at least one PEI based on the PEI configuration information. For example, the PEI may be transmitted periodically based on the periodicity of the PEI, and thus the BS may determine at least one PEI based on the periodicity of the PEI.

After determining the at least one PEI, in step 803, for each PEI of the at least one PEI, the BS may determine a first time period associated with the corresponding PEI based on the PO association configuration information. The methods for determining the first time period performed by the BS may the same as those performed by the UE in FIG. 4.

After determining the first time period, in step 804, for each PEI, the BS may determine a first set of POs associated with the corresponding PEI in the first time period. The methods for determining the first set of POs associated with the corresponding PEI in the first time period performed by the BS may the same as those performed by the UE in FIG. 4.

In some embodiment, the BS may determine a first set of POs associated with the PEI in the first time period based on the paging configuration information. For example, at least based on the parameters in Table 1, the BS may determine a first set of POs in the first time period.

In some other embodiments, the first time period may be determined based on the second time period and the offset. In this case, the BS may first determine a second set of POs in the second time period based on the paging configuration information, and then determine the first set of POs from the second set of POs based on the PO association configuration information (e.g., the offset). The methods for determine the first set of POs from the second set of POs by the BS may be similar to or the same as those performed by the UE in FIG. 4.

Then, in step 805, the BS may transmit the at least one PEI, each PEI of the at least one PEI may indicate whether a paging message or a short message is included in each of the first set of POs associated with the corresponding PEI.

The PEI may include at least one bit which is used for paging indication for the first set of POs associated with the PEI in the first time period. Depending on the number of POs in the first set of POs and the number of bits in the PEI, paging existence for the first set of POs may be indicated by the bits in the PEI with different methods.

According to some embodiments, the first set of POs includes X number of POs and the PEI includes T number of bits, and wherein X and T are integers greater than 0.

In some embodiments, X is equal to the T, and thus each PO in the first set of POs may correspond to an individual bit in the PEI. For each PO, the bit corresponding to the PO may indicate whether the paging message or the short message is included in the PO.

In some other embodiments, X is larger than T. In order to use T bits to indicate the paging message or short message for the X POs, the first set of POs may be divided into T groups of POs, and each group in the T groups may correspond to an individual bit in the PEI. The maximum number of POs included in each group may be ceil (X/T). For each group of POs, the bit corresponding to the group of POs may indicate whether the paging message or the short message is included in the group of POs.

In another embodiment, in the case that X is larger than T, the first set of POs may be divided into ceil (X/T) groups of POs, and each group in the ceil (X/T) groups may correspond to an individual bit in the PEI. For each group of POs, the bit corresponding to the group of POs, the bit indicates whether the paging message or the short message is included in the group of POs.

In yet another embodiment, in the case that X is larger than T, the first set of POs may be divided into a number of group, wherein each group may include ceil (X/T) of POs. Each group in the number groups may correspond to an individual bit in the PEI. For each group of POs, the bit corresponding to the group of POs may indicate whether the paging message or the short message is included in the group of POs.

In yet another embodiment, in the case that X is larger than T, each of last T number of POs in the first set of POs may correspond to an individual bit in the PEI. For each of last T number of POs, the bit corresponding to the PO may indicate whether the paging message or the short message is included in the PO.

In yet another embodiment, in the case that X is larger than T, each of last T−1 number of POs in the first set of POs may correspond to an individual bit in the PEI. For each of last T−1 number of POs, the bit corresponding to the corresponding PO may indicate whether the paging message or the short message is included in the corresponding PO. The rest POs in the first set of POs may be grouped to form a PO group and may correspond to an individual bit in the PEI. The bit corresponding to the PO group may indicate whether the paging message or the short message is in included the PO group.

In some other embodiments, X is smaller than T. Then, the at least one UE associated with each PO in the first set of POs is divided into floor (T/X) groups of UEs. Each group in the floor (T/X) groups may correspond to an individual bit in the PEI. For each group of UEs, the bit corresponding to the group of UEs may indicate whether the paging message or the short message for the group of UEs is included in the PO associated with the group of UEs.

Figure 9:
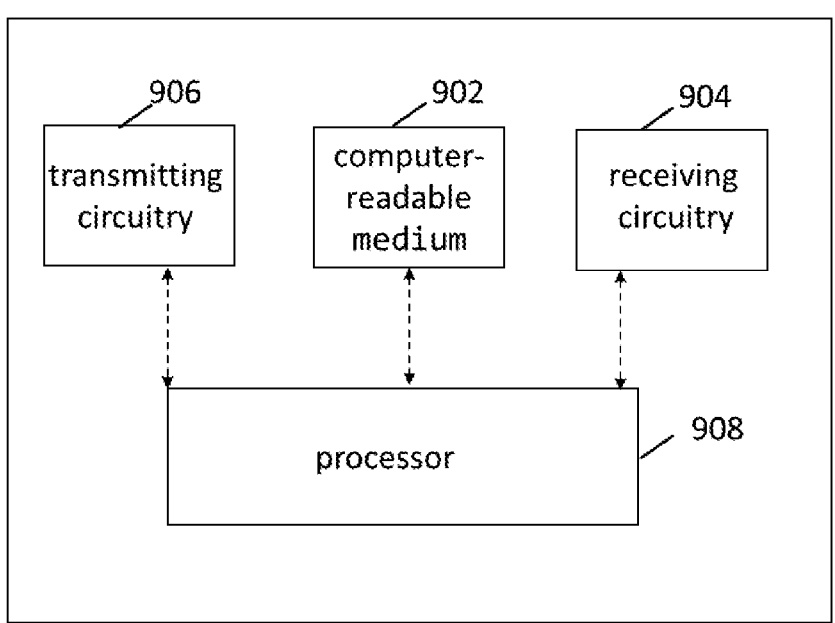
FIG. 9 illustrates a simplified block diagram of an apparatus for paging according to some embodiments of the present application.

FIG. 9 illustrates a simplified block diagram of an apparatus for paging according to some embodiments of the present application. The apparatus 900 may include a UE or a BS as shown in FIG. 1.

Referring to FIG. 9, the apparatus 900 may include at least one non-transitory computer-readable medium 902, at least one receiving circuitry 904, at least one transmitting circuitry 906, and at least one processor 908. In some embodiment of the present application, at least one receiving circuitry 904 and at least one transmitting circuitry 906 and be integrated into at least one transceiver. The at least one non-transitory computer-readable medium 902 may have computer executable instructions stored therein. The at least one processor 908 may be coupled to the at least one non-transitory computer-readable medium 902, the at least one receiving circuitry 904 and the at least one transmitting circuitry 906. The computer executable instructions can be programmed to implement a method with the at least one receiving circuitry 904, the at least one transmitting circuitry 906 and the at least one processor 908. The method may include the operations or steps as shown in FIG. 4 or 8.

The method according to embodiments of the present application can also be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this application. For example, an embodiment of the present application provides an apparatus for paging, including a processor and a memory. Computer programmable instructions for implementing a method for paging are stored in the memory, and the processor is configured to perform the computer programmable instructions to implement the method for paging. The method may be a method as stated above or other method according to an embodiment of the present application.

An alternative embodiment preferably implements the methods according to embodiments of the present application in a non-transitory, computer-readable storage medium storing computer programmable instructions. The instructions are preferably executed by computer-executable components preferably integrated with a network security system. The non-transitory, computer-readable storage medium may be stored on any suitable computer readable media such as RAMs, ROMs, flash memory, EEPROMs, optical storage devices (CD or DVD), hard drives, floppy drives, or any suitable device. The computer-executable component is preferably a processor but the instructions may alternatively or additionally be executed by any suitable dedicated hardware device. For example, an embodiment of the present application provides a non-transitory, computer-readable storage medium having computer programmable instructions stored therein. The computer programmable instructions are configured to implement a method for paging as stated above or other method according to an embodiment of the present application.

While this application has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skills in the art would be enabled to make and use the teachings of the application by simply employing the elements of the independent claims. Accordingly, embodiments of the application as set forth herein are intended to be illustrative, not limiting. Various changes may be made without departing from the spirit and scope of the application

What is claimed is:

1. A user equipment (UE), comprising:
   at least one memory; and
   at least one processor coupled with the at least one memory and configured to cause the UE to:
   receive paging configuration information, paging early indication (PEI) configuration information, and paging occasion (PO) association configuration information;
   determine a PO associated with a user equipment (UE) based on the paging configuration information;
   determine a PEI based on the PO and the PEI configuration information;
   determine a first set of POs in a first time period for the PEI based on the PO association configuration information; and
   detect a target bit in the PEI that is associated with the PO, wherein the target bit indicates whether a paging message or a short message is included in the PO.

2. The UE of claim 1, wherein the at least one processor is configured to cause the UE to:

determine a second set of POs in a second time period; and determine the first set of POs from the second set of POs based on the PO association configuration information.

3. The UE of claim 1, wherein the PEI configuration information includes a periodicity of the PEI.

4. The UE of claim 3, wherein the periodicity is determined based on a periodicity of a synchronization signal block (SSB).

5. The UE of claim 1, wherein a starting time of the first time period is a default value or determined based on the PO association configuration information.

6. The UE of claim 1, wherein a length of the first time period is a default value or determined based on the PO association configuration information.

7. The UE of claim 1, wherein the first set of POs includes X number of POs and the PEI includes T number of bits, and wherein X and T are integers greater than 0.

8. The UE of claim 7, wherein if X is larger than T, the first set of POs are divided into T groups of POs, and each group in the T groups corresponds to an individual bit in the PEI.

9. The UE of claim 7, wherein each bit of T bits of PEI indicates if there is paging message or short message that is transmitted for a group of UEs of the UEs associated with the PO.

10. The UE of claim 9, wherein T is equal to a number of UE groups multiply with X.

11. A processor for wireless communication, comprising:

at least one controller and at least one memory storying instructions executed by the processor to cause the processor to:

receive paging configuration information, paging early indication (PEI) configuration information, and paging occasion (PO) association configuration information;

determine a PO associated with a user equipment (UE) based on the paging configuration information;

determine a PEI based on the PO and the PEI configuration information;

determine a first set of POs in a first time period for the PEI based on the PO association configuration information; and detect a target bit in the PEI that is associated with the PO, wherein the target bit indicates whether a paging message or a short message is included in the PO.

12. The processor of claim 11, wherein the at least one controller is configured to cause the processor to:

determine a second set of POs in a second time period; and determine the first set of POs from the second set of POs based on the PO association configuration information.

13. The processor of claim 11, wherein the PEI configuration information includes a periodicity of the PEI.

14. The processor of claim 13, wherein the periodicity is determined based on a periodicity of a synchronization signal block (SSB).

15. The processor of claim 11, wherein a starting time of the first time period is a default value or determined based on the PO association configuration information.

16. The processor of claim 11, wherein a length of the first time period is a default value or determined based on the PO association configuration information.

17. The processor of claim 11, wherein the first set of POs includes X number of POs and the PEI includes T number of bits, and wherein X and T are integers greater than 0.

18. The processor of claim 17, wherein if X is larger than T, the first set of POs are divided into T groups of POs, and each group in the T groups corresponds to an individual bit in the PEI.

19. A base station, comprising:

at least one memory; and at least one processor coupled with the at least one memory and configured to cause the base station to:

transmit paging configuration information, paging early indication (PEI) configuration information, and paging occasion (PO) association configuration information;

determine a PEI based on the PEI configuration information;

determine a first time period for the PEI based on the PO association configuration information;

determine a first set of POs associated with the PEI in the first time period; and transmit the PEI, wherein the PEI indicates whether a paging message or a short message is included in each of the first set of POs.

20. A method performed by a user equipment (UE), the method comprising:

receiving paging configuration information, paging early indication (PEI) configuration information, and paging occasion (PO) association configuration information;

determining a PO associated with a user equipment (UE) based on the paging configuration information;

determining a PEI based on the PO and the PEI configuration information;

determining a first set of POs in a first time period for the PEI based on the PO association configuration information; and detecting a target bit in the PEI that is associated with the PO, wherein the target bit indicates whether a paging message or a short message is included in the PO.

* * * * *